(12) United States Patent
You et al.

(10) Patent No.: US 10,697,670 B2
(45) Date of Patent: Jun. 30, 2020

(54) HELIOSTAT SURFACE SHAPE DETECTION SYSTEM AND METHOD BASED ON MULTI-VIEW IMAGE RECOGNITION

(71) Applicant: SHANGHAI PARASOL RENEWABLE ENERGY CO., LTD, Shanghai (CN)

(72) Inventors: Siliang You, Shanghai (CN); Nan Sun, Shanghai (CN); Yuda Chen, Shanghai (CN)

(73) Assignee: SHANGHAI PARASOL RENEWABLE ENERGY CO., LTD, Shanghai (CN)

( * ) Notice: Subject to any disclaimer, the term of this patent is extended or adjusted under 35 U.S.C. 154(b) by 80 days.

(21) Appl. No.: 16/194,292

(22) Filed: Nov. 17, 2018

(65) Prior Publication Data
US 2019/0086122 A1 Mar. 21, 2019

Related U.S. Application Data

(63) Continuation of application No. PCT/CN2018/081856, filed on Apr. 4, 2018.

(51) Int. Cl.
| | | |
|---|---|---|
| *G06T 7/00* | (2017.01) | |
| *F24S 50/20* | (2018.01) | |
| *G05B 23/02* | (2006.01) | |
| *F24S 20/20* | (2018.01) | |
| *G06K 9/20* | (2006.01) | |
| *G05D 3/12* | (2006.01) | |
| *F24S 23/70* | (2018.01) | |
| *G06T 7/55* | (2017.01) | |

(Continued)

(52) U.S. Cl.
CPC .............. *F24S 50/20* (2018.05); *F24S 20/20* (2018.05); *F24S 23/70* (2018.05); *F24S 80/00* (2018.05); *G01B 11/245* (2013.01); *G05B 23/02* (2013.01); *G05D 3/12* (2013.01); *G06K 9/209* (2013.01); *G06T 7/0004* (2013.01); *G06T 7/55* (2017.01); *G06T 7/571* (2017.01)

(58) Field of Classification Search
None
See application file for complete search history.

(56) References Cited

U.S. PATENT DOCUMENTS

| | | | | |
|---|---|---|---|---|
| 8,104,893 B2 * | 1/2012 | Reznik | ................ | G01S 3/7861 353/3 |
| 2010/0139644 A1 * | 6/2010 | Schwarzbach | .......... | F24S 50/20 126/573 |

(Continued)

FOREIGN PATENT DOCUMENTS

| | | | |
|---|---|---|---|
| CN | 105157592 A | * | 12/2015 |
| CN | 105157592 A | | 12/2015 |

(Continued)

*Primary Examiner* — Delomia L Gilliard

(57) ABSTRACT

A heliostat surface shape detection system and a method based on multi-view image recognition are described. The system includes a multi-view image collector array, a bracket and a computer. The multi-view image collector array is arranged on the bracket so that the main optical axes of image collectors are parallel to each other and point to the heliostat; the multi-view image collector array is connected with the computer via data lines, and transmits the collected image data to the computer for heliostat surface shape calculation.

1 Claim, 2 Drawing Sheets

(51) Int. Cl.
*F24S 80/00* (2018.01)
*G01B 11/245* (2006.01)
*G06T 7/571* (2017.01)

(56) References Cited

U.S. PATENT DOCUMENTS

| | | | | |
|---|---|---|---|---|
| 2011/0000478 A1* | 1/2011 | Reznik | ............... | G01S 3/7861 |
| | | | | 126/574 |
| 2013/0139804 A1* | 6/2013 | Goldberg | ............... | F24S 50/20 |
| | | | | 126/578 |
| 2016/0069817 A1* | 3/2016 | Zavodny | ............ | G01N 21/8851 |
| | | | | 356/445 |

FOREIGN PATENT DOCUMENTS

| | | | | |
|---|---|---|---|---|
| CN | 108844486 A | * | 11/2018 | |
| WO | WO-2018210072 A1 | * | 11/2018 | ............... F24S 50/20 |

* cited by examiner

US 10,697,670 B2

HELIOSTAT SURFACE SHAPE DETECTION SYSTEM AND METHOD BASED ON MULTI-VIEW IMAGE RECOGNITION

CROSS REFERENCE TO RELATED APPLICATIONS

The present application is a Continuation Application of PCT Application No. PCT/CN2018/081856 filed on Apr. 4, 2018, which claims the benefit of Chinese Patent Application No. 201710353911.6 filed on May 18, 2017. All the above are hereby incorporated by reference.

FIELD OF THE INVENTION

The present invention relates to a heliostat surface shape detection system and method based on multi-view image recognition, and belongs to the technical field of heliostat surface shape detection.

BACKGROUND OF THE INVENTION

In a tower-type solar thermal power station, a heliostat reflects and gathers the sunlight irradiated onto its surface to a heat absorber, and then obtains solar energy through the heat absorber for power generation. In order to gather more energy on the surface of the heat absorber, the surface shape of each heliostat is a high-precision discrete curved surface with converging characteristics. There are many errors in the actual manufacturing process of heliostats, which will reduce the accuracy of the surface shape, affect the effect of sunlight convergence, and influence the effective energy obtained by the heat absorber. Therefore, it is necessary to accurately measure the surface shape of the heliostat to ensure the power generation efficiency of the tower-type solar thermal power station.

At present, the surface shape detection technology is mainly divided into contact type and non-contact type. The contact surface shape detection method is based on a displacement sensor or a probe and is not suitable for a precise optical mirror surface, and will exert a force on the mirror surface during detection, thus easily affecting the detection accuracy. The existing non-contact detection technology is based on stripe projection, which directly projects the stripe onto the surface of the object to be measured and calculates the heliostat surface shape through the bending and changes of the stripe. This method is suitable for objects with a diffuse reflecting surface, but it is difficult for the image collector to obtain effective stripe images when the reflectivity of the object surface is high, or even to complete the surface shape detection. The non-contact detection technique is to project the stripes onto the screen, then adjust the relative position between the heliostat and the screen, and finally calculate the heliostat surface shape by shooting the stripe image on the heliostat surface with an image collector. For this method, the relative positions among the image collector, the heliostat and the screen should be adjusted according to the heliostat before each detection, so as to obtain a complete stripe image; meanwhile, this method has higher requirements for the detection environment; the measured heliostat mirror is easily interfered by stray light, which affects the contrast and correctness of the stripe image. Therefore, there is a need for a high-precision and high-efficiency detection method which is able to detect the heliostat surface shape with high reflection characteristics.

SUMMARY OF THE INVENTION

The purpose of the present invention is to provide a non-contact heliostat surface shape detection system and method based on multi-view image recognition, which doesn't interact with the heliostat surface and can ensure high-precision and high-efficiency heliostat surface shape detection.

To achieve the above purpose, the technical proposal of the present invention is as follows:

The present invention relates to a heliostat surface shape detection system based on multi-view image recognition, characterized in comprising a multi-view image collector array, a bracket and a computer, wherein the multi-view image collector array is arranged on the bracket so that the main optical axes of image collectors are parallel to each other and point to the heliostat; the multi-view image collector array is connected with the computer via data lines, and transmits the collected image data to the computer for heliostat surface shape calculation.

In the present invention: the image collectors of the multi-view image collector array are stably installed on the bracket at equal intervals, and the number of image collectors in the multi-view image collector array is determined according to the external dimensions of the measured heliostat and the image collectors can be installed in the form of modules.

In the present invention: the number of image collectors in the multi-view image collector array is at least 2.

A heliostat surface shape detection system based on multi-view image recognition, characterized in that the 3D surface shape of the heliostat to be measured is reconstructed by measuring the pitch angle and roll angle of each sub-mirror, including the following steps:

(1) Determining the distance from the heliostat to the bracket and the number of image collectors (at least 2) in the multi-view image collector array according to the external dimensions of the heliostat;

(2) Stably mounting the multi-view image collector array on the bracket and adjusting each image collector so that their main optical axes are parallel to each other and aligned with the heliostat;

(3) The multi-view image collector array collects heliostat images of the corresponding field of view and transmits them to the computer respectively;

(4) Performing feature matching on the collected image data through the feature recognition technology in the image recognition technology to determine corresponding feature points in the common field of view of a plurality of image collectors; that is, a feature point of the heliostat will have a real image on each image collector corresponding to the multi-view image collector array;

(5) The deviation between the real image of the same feature point in multiple image collectors and the image center in the image coordinate system is ($X_i$, $Y_i$), where i represents the image collector number; the center of the multi-view image collector array is the origin of the multi-view measurement coordinate system (satisfying the right-hand rule), and the Z axis points to the heliostat; the center coordinates of each image collector are ($x_i$, $y_i$, 0), and the distance between image collectors is L (unit: m); therefore, the coordinates of the multi-view measurement coordinate system of each real image point are ($x_i + X_i \cdot Size_{Pixel}$, $y_i + Y_i \cdot Size_{Pixel}$, 0);

(6) Given the focal length of the multi-view image collector array (1) is f, the coordinates of the equivalent lens center of each image collector are ($x_i$, $y_i$, f); the 3D linear equation involving the equivalent lens center and the corresponding real image is $$\frac{x - x_i}{X_i \cdot Size_{Pixel}} = \frac{y - y_i}{Y_i \cdot Size_{Pixel}} = \frac{z - f}{-f}; \quad (1)$$

(7) According to Formula (1), a single feature point of the heliostat can establish a plurality of 3D linear equations in the multi-view image collector array, and the relative coordinates $(x_j, y_j, z_j)$ of the linear intersection points in the multi-view measurement coordinate system can be obtained by concatenating the above equations, that is, the relative coordinates of the single feature point of the heliostat;

(8) By repeating the above process, the relative position information of the mirror surface of the heliostat in the multi-view measurement coordinate system can be obtained, and the surface shape of the heliostat can be calculated.

With the above structure, the present invention has the following beneficial effects:
1. The present invention, with a simple system structure and reasonable design, adopts non-contact detection which avoids interaction with the heliostat surface, and ensures high-precision and high-efficiency heliostat surface shape detection;
2. The present invention calculates the relative position information of the measured surface through the principle of multiple-view distance measurement, and is not sensitive to the reflectivity characteristics of the measured surface;
3. The present invention calculates the heliostat surface shape according to the feature information of the surface, effectively detects the surface shape of both continuous and discrete heliostats, and has a wide application range; and
4. By splicing the multi-view image collector array, enough fields of view are obtained to detect the surface shape of the whole heliostat; for heliostats with similar appearance and size, only one calibration is needed, and batch detection of various surface shapes can be completed, which is easy to operate and implement and improves the detection efficiency. The measured heliostat surface is directly photographed by the multi-view image collector array, which is not easily affected by stray light and has good anti-interference performance.

BRIEF DESCRIPTION OF THE DRAWINGS

The drawings described herein are intended to provide a further understanding of the present invention and form a part of this application, but do not constitute an undue limitation on the present invention, in which.

In the figures: 1. multi-view image collector array; 2. bracket; 3. computer; 4. heliostat; 5. real image.

DETAILED DESCRIPTION OF PREFERRED EMBODIMENTS

The present invention will now be described in detail with reference to the accompanying drawings and embodiments, in which the illustrative embodiments and descriptions are only for the purpose of explaining the present invention, and are not to be taken as limiting the present invention.

As shown in FIGS. 1-4, a heliostat surface shape detection system based on multi-view image recognition, comprising a multi-view image collector array 1, a bracket 2 and a computer 3, wherein the multi-view image collector array 1 is arranged on the bracket 2 so that the main optical axes of image collectors are parallel to each other and point to the heliostat 4; the multi-view image collector array 1 is connected with the computer 3 via data lines, and transmits the collected image data to the computer 3 for heliostat surface shape calculation. The image collectors of the multi-view image collector array 1 are stably installed on the bracket 2 at equal intervals, and the number of image collectors in the multi-view image collector array 1 is determined according to the external dimensions of the measured heliostat 4 and the image collectors can be installed in the form of modules. The number of image collectors in the multi-view image collector array 1 is at least 2.

Figure 1:
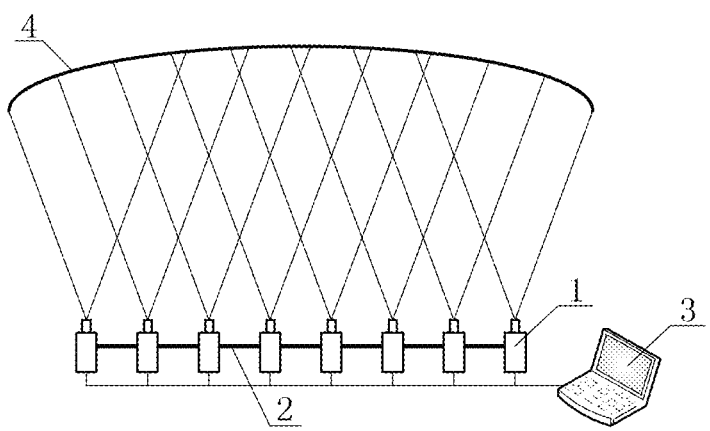
FIG. 1 is a schematic diagram of the detection system of the present invention.
Figure 2:
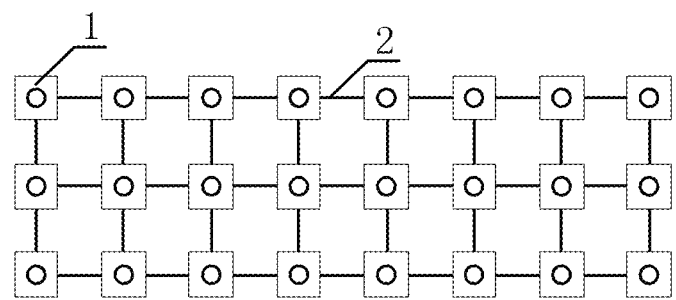
FIG. 2 is a schematic diagram of the multi-view image collector array of the present invention.
Figure 3:
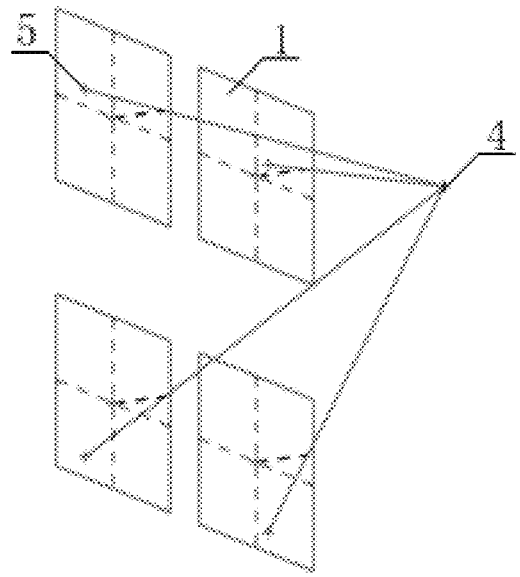
FIG. 3 is a schematic diagram of multi-view imaging of the present invention.
Figure 4:
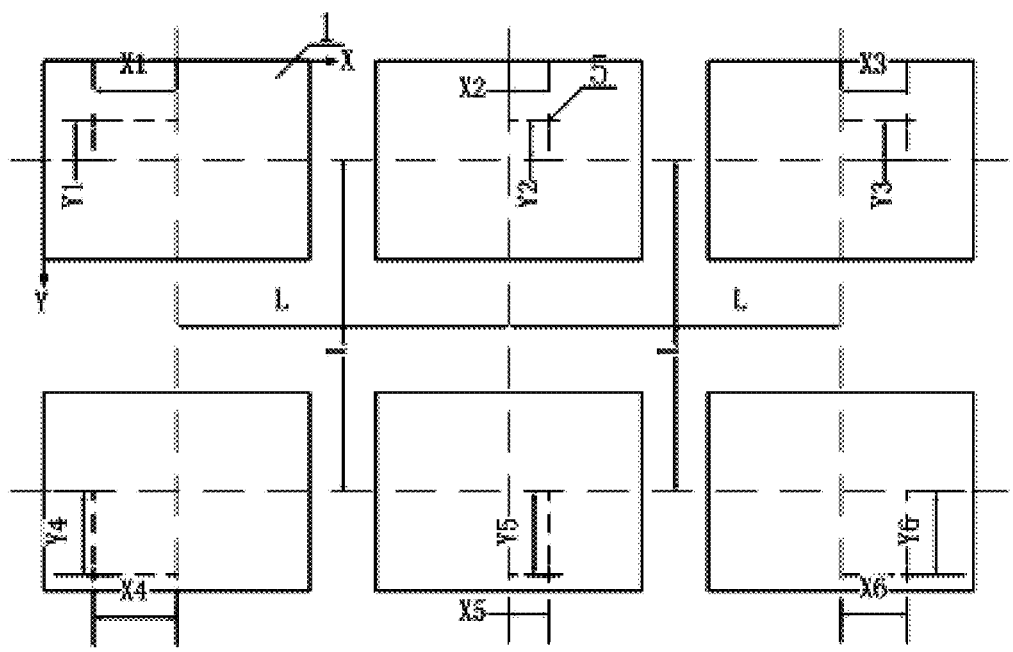
FIG. 4 is a schematic diagram of the deviation of the real image of the same feature point in multiple image collectors from the image center in the image coordinate system of the present invention.

A heliostat surface shape detection system based on multi-view image recognition, characterized in that the 3D surface shape of the heliostat to be measured is reconstructed by measuring the pitch angle and roll angle of each sub-mirror, including the following steps:

(1) As shown in FIG. 1, determining the distance from the heliostat 4 to the bracket 2 and the number of image collectors (at least 2) in the multi-view image collector array 1 according to the external dimensions of the heliostat 4;

(2) Stably mounting the multi-view image collector array 1 on the bracket 2 and adjusting each image collector so that their main optical axes are parallel to each other and aligned with the heliostat 4;

(3) The multi-view image collector array 1 collects heliostat images of the corresponding field of view and transmits them to the computer 3 respectively;

(4) Performing feature matching on the collected image data through the feature recognition technology in the image recognition technology to determine corresponding feature points in the common field of view of a plurality of image collectors; as shown in FIG. 3, a feature point of the heliostat 4 will have a real image 5 on each image collector corresponding to the multi-view image collector array 1;

(5) As shown in FIG. 4, the deviation between the real image 5 of the same feature point in multiple image collectors and the image center in the image coordinate system is $(X_i, Y_i)$, where i represents the image collector number; the center of the multi-view image collector array (1) is the origin of the multi-view measurement coordinate system (satisfying the right-hand rule), and the Z axis points to the heliostat; the center coordinates of each image collector are $(x_i, y_i, 0)$, and the distance between image collectors is L (unit: m); therefore, the coordinates of the multi-view measurement coordinate system of each real image point are $(x_i + X_i \cdot Size_{Pixel}, y_i + Y_i \cdot Size_{Pixel}, 0)$;

(6) Given the focal length of the multi-view image collector array (1) is f, the coordinates of the equivalent lens center of each image collector are $(x_i, y_i, f)$; the 3D linear equation involving the equivalent lens center and the corresponding real image 5 is $$\frac{x - x_i}{X_i \cdot Size_{Pixel}} = \frac{y - y_i}{Y_i \cdot Size_{Pixel}} = \frac{z - f}{-f}; \quad (2)$$

(7) According to Formula (1), a single feature point of the heliostat 4 can establish a plurality of 3D linear equations in the multi-view image collector array 1, and the relative coordinates $(x_j, y_j, z_j)$ of the linear intersection points in the multi-view measurement coordinate system can be obtained by concatenating the above equations, that is, the relative coordinates of the single feature point of the heliostat 4; and (8) By repeating the above process, the relative position information of the mirror surface of the heliostat 4 in the multi-view measurement coordinate system can be obtained, and the surface shape of the heliostat 4 can be calculated.

The embodiments are only the preferred embodiments of the present invention. Therefore, the equivalent changes or modifications made in accordance with the structure, features and principles in the scope of patentable claims of the present invention shall also fall within the scope of the present invention.

What is claimed is:

1. A surface shape detection method of a heliostat based on multi-view image recognition, a 3D surface shape of the heliostat being reconstructed by measuring a pitch angle and a roll angle of each sub-mirror of the heliostat, the method comprising:
   (1) determining a distance from the heliostat to a bracket and the number of image collectors in a multi-view image collector array according to an external dimension of the heliostat;
   (2) mounting the multi-view image collector array on the bracket and adjusting each image collector so that main optical axes of the image collectors are parallel to each other and aligned with the heliostat;
   (3) collecting, by the multi-view image collector array, heliostat images of a field of view corresponding to the multi-view image collector array and transmitting the heliostat images to a computer respectively;
   (4) performing feature matching on the collected image data through a feature recognition technology in an image recognition technology to determine corresponding feature points in a common field of view of a plurality of image collectors, wherein a feature point of the heliostat has a real image on each image collector corresponding to the multi-view image collector array;
   (5) wherein a deviation between the real image of the feature point in each image collector and an image center in an image coordinate system is $(X_i, Y_i)$, where i represents a number of the image collector; a center of the multi-view image collector array is an origin of a multi-view measurement coordinate system satisfying the right-hand rule, and a Z axis of the multi-view measurement coordinate system points to the heliostat; center coordinates of each image collector are $(x_i, y_i, 0)$, and a distance between image collectors is L, coordinates of the multi-view measurement coordinate system of each real image point are $(x_i+X_i \cdot Size_{Pixel}, y_i+Y_i \cdot Size_{Pixel}, 0)$;
   (6) given a focal length of the multi-view image collector array is f, coordinates of an equivalent lens center of each image collector are $(x_i, y_i, f)$; a 3D linear equation involving the equivalent lens center and the corresponding real image is $$\frac{x-x_i}{X_i \cdot Size_{Pixel}} = \frac{y-y_i}{Y_i \cdot Size_{Pixel}} = \frac{z-f}{-f}$$

(7) according to the equation $$\frac{x-x_i}{X_i \cdot Size_{Pixel}} = \frac{y-y_i}{Y_i \cdot Size_{Pixel}} = \frac{z-f}{-f},$$

a single feature point of the heliostat establishes a plurality of 3D linear equations in the multi-view image collector array, and relative coordinates $(x_i, y_i, z_i)$ of linear intersection points in the multi-view measurement coordinate system are obtained by concatenating the plurality of 3D linear equations, the relative coordinates $(x_i, y_i, z_i)$ of linear intersection points are the relative coordinates of the single feature point of the heliostat; and
   (8) repeating the steps (3)-(7) to obtain a relative position information of a mirror surface of the heliostat in the multi-view measurement coordinate system, and calculating the surface shape of the heliostat.

\* \* \* \* \*